(12) United States Patent
Fujii et al.

(10) Patent No.: US 10,775,342 B2
(45) Date of Patent: Sep. 15, 2020

(54) GAS SENSOR

(71) Applicant: NGK Spark Plug Co., LTD., Nagoya (JP)

(72) Inventors: Tomoki Fujii, Kani (JP); Takehiro Oba, Konan (JP)

(73) Assignee: NGK Spark Plug Co., LTD., Nagoya (JP)

(*) Notice: Subject to any disclaimer, the term of this patent is extended or adjusted under 35 U.S.C. 154(b) by 34 days.

(21) Appl. No.: 16/165,404

(22) Filed: Oct. 19, 2018

(65) Prior Publication Data

US 2019/0128837 A1  May 2, 2019

(30) Foreign Application Priority Data

Oct. 27, 2017  (JP) .................................. 2017-207890

(51) Int. Cl.
*G01N 27/407*  (2006.01)

(52) U.S. Cl.
CPC ................................ *G01N 27/4077* (2013.01)

(58) Field of Classification Search
CPC .................... G01N 27/4071; G01N 27/4077
See application file for complete search history.

(56) References Cited

U.S. PATENT DOCUMENTS

| 4,415,878 A * | 11/1983 | Novak | G01N 27/4067 338/34 |
| 4,624,770 A * | 11/1986 | Yamada | G01N 27/4077 204/425 |
| 4,916,934 A * | 4/1990 | Nagata | G01N 27/4077 204/428 |
| 2009/0100907 A1 | 4/2009 | Mizutani et al. | |

FOREIGN PATENT DOCUMENTS

JP  2009-115781 A  5/2009

OTHER PUBLICATIONS

Kawaguchi et al., "Flow Investigations within a Concentric Cylinders of Gas Sensor Module for I.C. Engines," International Journal of Geomate, Oct. 2019, vol. 17, issue 62, pp. 77-83 (Year: 2019).*

* cited by examiner

*Primary Examiner* — Alexander S Noguerola
(74) *Attorney, Agent, or Firm* — Leason Ellis LLP

(57) ABSTRACT

In a circular cross section of a protector obtained by cutting the protector along a plane which is orthogonal to the axial direction and passes through gas introduction holes, one gas introduction hole and another gas introduction hole having an opening area different from that of the one gas introduction hole are arranged along an imaginary line passing through the center of the circular cross section such that the two gas introduction holes are located on opposite sides with respect to the center of the circular cross section.

4 Claims, 4 Drawing Sheets

GAS SENSOR

This application claims the benefit of Japanese Patent Application No. 2017-207890, filed Oct. 27, 2017, which is incorporated herein by reference in its entirety.

FIELD OF THE INVENTION

The present invention relates to a gas sensor including a sensor element that is exposed to a subject gas and detects a specific gas component in the subject gas.

BACKGROUND OF THE INVENTION

One known gas sensor attached in use to, for example, an exhaust pipe of an automobile includes a sensor element which generates an electromotive force that changes with the concentration of a specific gas (e.g., NOx (nitrogen oxides) or oxygen) in exhaust gas or whose resistance value changes with the concentration. A sensing section for detecting the specific gas component is provided at the forward end of the sensor element. The sensing section is heated by, for example, a heater to detect the specific gas component. In the case where the sensing section of the sensor element is at high temperature, when water droplets contained in the exhaust gas adhere to the sensing section (the sensing section is wetted with water), the sensor element may break (for example, may crack) due to thermal shock. Therefore, a gas sensor in which the sensing section of the sensor element is covered with a protector to protect the sensor element from wetting with water has been developed (see, for example, Japanese Unexamined Publication No. 2009-115781).

As shown in FIG. 5, the gas sensor disclosed in Japanese Unexamined Publication No. 2009-115781 has a structure in which a sensor element 21 is inserted into and held within an insertion hole 320 of a ceramic holder 300 formed of an insulating material (ceramic such as alumina) and the ceramic holder 300 is disposed inside a metallic shell 1100. A sensing section at the forward end of the sensor element 21 is covered with a protective layer 25.

The metallic shell 1100 has a bore 1100*h* extending therethrough in a forward-rear direction, and a rear end portion 26 of the protective layer 25 of the sensor element 21 protruding forward from the ceramic holder 300 is accommodated within the bore 1100*h*. Metallic protectors 510 and 610 are attached to the forward end of the metallic shell 1100 so as to protect the sensor element 21. Gas passage holes 560 and 670 of the protectors 510 and 610 are arranged in the circumferential direction so as to be point-symmetric with respect to the center of the protectors.

Problems to be Solved by the Invention

In the gas sensor in FIG. 5, when a gas under measurement is introduced through the gas passage holes 560 and 670 of the protectors 510 and 610, as shown by an arrow, the gas under measurement impinges against portions of the sensor element 21, which portions face the gas passage holes 560, and most of the gas under measurement is discharged directly from a gas discharge hole 680 on the forward end side. Therefore, although the gas under measurement is not readily introduced into the bore 1100*h*, no problem arises so long as the sensing section is disposed forward of the gas passage holes 560.

However, when the sensing section is disposed rearward of the gas passage holes 560, the gas under measurement does not easily reach the sensing section, and the responsiveness of the sensor element may deteriorate. When the forward end of the sensor element is disposed rearward of the gas passage holes 560 for the purpose of reducing the size of the gas sensor, it is important to produce a flow of the gas under measurement toward the bore 1100*h*. However, in the protectors 510 and 610 in FIG. 5, since the gas passage holes having the same opening area are disposed so as to be point-symmetric, flows of the gas under measurement introduced collide against each other and are thereby disturbed, so it is difficult to produce a flow of the gas under measurement toward the bore 1100*h*. This may cause deterioration in responsiveness of the sensor element.

The present invention has been made in view of the above circumstances, and an object thereof is to provide a gas sensor that can be reduced in size without deterioration in responsiveness of the sensor element.

SUMMARY OF THE INVENTION

Means for Solving the Problems

A gas sensor according to an one aspect of the present disclosure comprises a sensor element extending in an axial direction and including a sensing section which is disposed at a forward end of the sensor element and detects a specific gas component in a subject gas; a tubular metallic shell which circumferentially surrounds and holds the sensor element; and a protector that has a circumferential wall and a forward end wall disposed forward of the circumferential wall, the protector having a rear end portion fixed to a forward end of the metallic shell, the protector having gas introduction holes which are formed in the circumferential wall and through which the subject gas is introduced into the protector. The sensing section is disposed rearward of a rearmost one of the gas introduction holes. In a circular cross section of the protector formed along a plane which is orthogonal to the axial direction and passes through the gas introduction holes, one gas introduction hole and another gas introduction hole having an opening area different from that of the one gas introduction hole are arranged along an imaginary line passing through the center of the circular cross section such that the two gas introduction holes are located on opposite sides with respect to the center of the circular cross section.

In this gas sensor, since one gas introduction hole and another gas introduction hole having an opening area different from that of the one gas introduction hole are arranged on opposite sides with respect to the center of the circular cross section, even when the gas under measurement introduced through the gas introduction hole located on one side and the gas under measurement introduced through the gas introduction hole located on the other side collide against each other, a flow of the gas under measurement toward a bore of the metallic shell can be produced, because the amount of the gas under measurement introduced through the gas introduction hole having a larger opening area is larger than the amount of the gas under measurement introduced through the gas introduction hole having a smaller opening area.

The gas sensor according to the one aspect of the present disclosure may be configured such that, when the circular cross section is bisected into first and second divisional regions by a straight line which passes through the center of the circular cross section and does not pass through the gas introduction holes, the total opening area of the gas introduction hole located in the first divisional region is smaller than the total opening area of the gas introduction hole located in the second divisional region.

In this gas sensor, even when the gas under measurement introduced through the gas introduction hole located in the first divisional region collides with the gas under measurement introduced through the gas introduction hole located in the second divisional region, a strong flow of the gas under measurement toward the bore of the metallic shell can be produced, because the amount of the gas under measurement introduced through the gas introduction hole located in the second divisional region and having a larger total opening area is larger than the amount of the gas under measurement introduced through the gas introduction hole located in the first divisional region.

The gas sensor according to the one aspect of the present disclosure may be configured such that a forward end of the sensor element is located rearward of the rearmost one of the gas introduction holes.

In this gas sensor, the gas under measurement introduced through the gas introduction hole in the second divisional region collides with a portion of the inner wall of the protector, which portion faces the gas introduction hole, without collision with the sensor element. Therefore, it is possible to produce a strong flow of the gas under measurement toward the bore of the metallic shell without disturbing the gas flow.

BRIEF DESCRIPTION OF THE DRAWINGS

These and other features and advantages of the present invention will become more readily appreciated when considered in connection with the following detailed description and appended drawings, wherein like designations denote like elements in the various views, and wherein.

DETAILED DESCRIPTION OF THE INVENTION

Gas sensors according to embodiments of the present invention will be described in detail with reference to FIGS. 1 to 3. Each of the gas sensors is a full-range air-fuel-ratio gas sensor that detects the concentration of oxygen in exhaust gas. The general structure of the gas sensor 1 will first be described, and then the components thereof and their structures will be described in detail.

Figure 1:
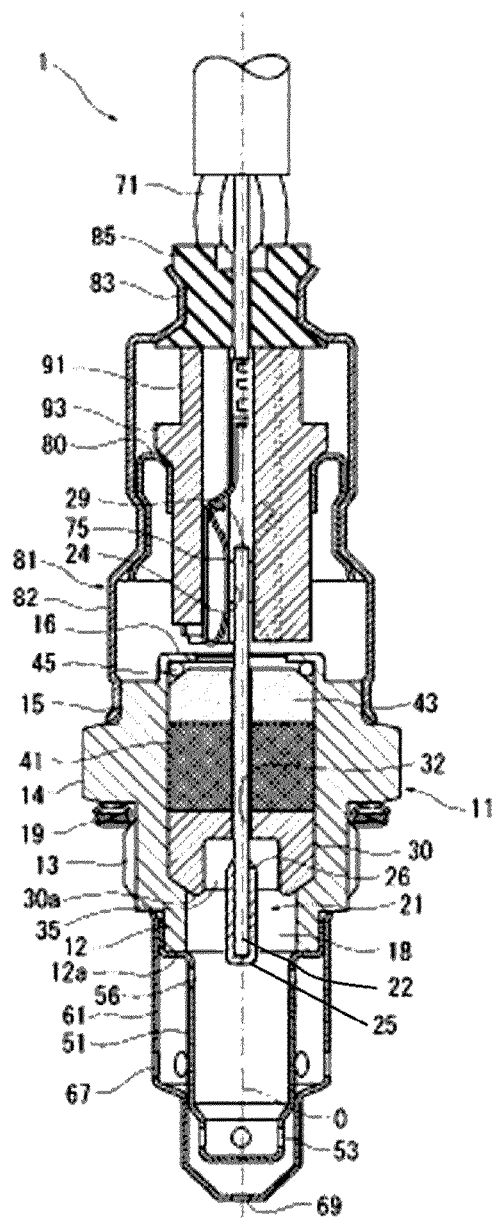
FIG. 1 is a cross-sectional view of a gas sensor according to an embodiment of the present invention.

As shown in FIG. 1, the gas sensor (full-range air-fuel-ratio gas sensor) 1 includes a sensor element 21, a ceramic holder 30 having an insertion hole 32 into which the sensor element 21 is inserted, and a metallic shell 11 that surrounds the radial circumference of the ceramic holder 30.

Figure 2:
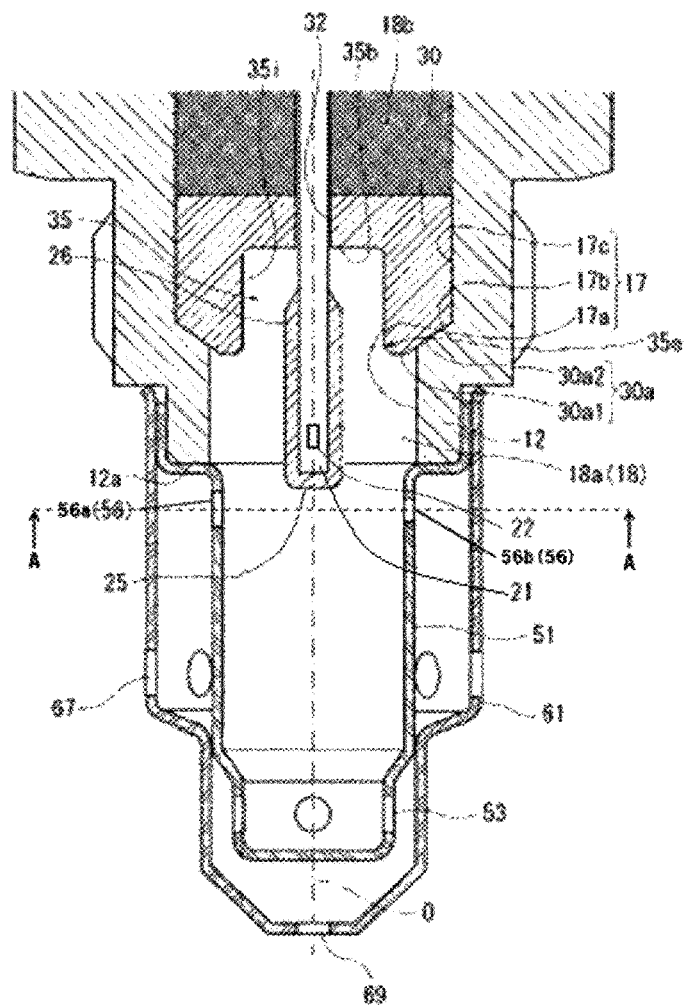
FIG. 2 is an enlarged illustration of part of FIG. 1.
Figure 3:
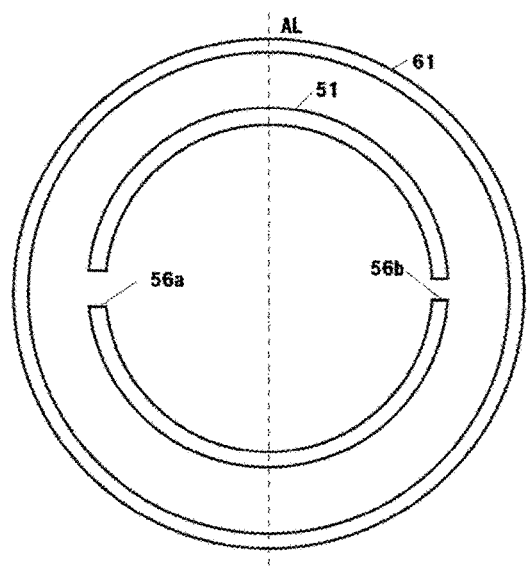
FIG. 3 is a circular cross-sectional view in a first embodiment.

A forward end portion of the sensor element 21 in which a sensing section 22 is formed protrudes forward from a forward-facing surface 30a of the ceramic holder 30 (see FIG. 2). A seal member (talc in the present embodiment) 41 disposed rearward (on the upper side in the figures) of the ceramic holder 30 is compressed in a forward-rear direction through a sleeve 43 formed of an insulating material and a ring washer 45. Thus, the sensor element 21 passing through the insertion hole 32 is fixed inside the metallic shell 11, while gas-tightness in the forward-rear direction is maintained. A rear end portion of the sensor element 21 including its rear end 29 (hereinafter, the rear end portion will be referred to as the "rear end 29 side portion") protrudes rearward beyond the sleeve 43 and the metallic shell 11. Metallic terminals 75 disposed at the forward ends of lead wires 71 extending to the outside through a seal member 85 are in pressure-contact with and electrically connected to respective electrode terminals 24 formed in the rear end 29 side portion of the sensor element 21. The rear end 29 side portion of the sensor element 21, including the electrode terminals 24, is covered with a protective tube 81. The gas sensor 1 will be described in more detail.

The sensor element 21 extends in the direction of an axial line O, has a strip shape (plate shape), and includes the sensing section 22 that is disposed at the forward end (the lower end in the figure) exposed to the measurement target and includes detection electrodes (not shown) etc. for detection of a specific gas component in the subject gas. The sensor element 21 has a rectangular transverse cross section whose size is constant in the forward-rear direction, is composed mainly of a ceramic (such as a solid electrolyte), and formed as a long and narrow member. The sensing section 22 of the sensor element 21 is covered with a porous protective layer 25 made of alumina, spinel, etc. In a region in which the protective layer 25 is formed, the sensor element 21 has a transverse cross section which is larger than other transverse cross sections thereof by an amount corresponding to the thickness of the protective layer 25 (e.g., 0.5 to 0.6 mm) (the thickness is exaggerated in the figure). The sensor element 21 itself is the same as those known in the art. A pair of detection electrodes constituting the sensing section 22 are disposed in a forward end portion of the solid electrolyte (member), and a pair of electrode terminals 24 extending from the detection electrodes are formed in a rear end portion of the solid electrolyte such that the electrode terminals 24 are exposed to the outside. A pair of lead wires 71 for outputting detection output are connected to the electrode terminals 24. In the present embodiment, the sensor element 21 has a heater (not shown) which is provided in a forward end portion of a ceramic member stacked on the solid electrolyte (member). Another pair of electrode terminals 24 to which another pair of lead wires 71 are connected are formed in a rear end portion of the ceramic member such that the electrode terminals 24 are exposed to the outside. A voltage is applied to the heater though the second pair of electrode terminals 24. Although not illustrated, these electrode terminals 24 each have a rectangular shape elongated vertically and are provided in the rear end 29 side portion of the strip-shaped sensor element 21 such that two or three electrode terminals are arranged laterally on each of opposite main faces of the sensor element 21 which are winder than the remaining surfaces thereof.

The metallic shell 11 includes concentric tubular portions arranged in the forward-rear directions and having different diameters. Specifically, a small-diameter cylindrical annular portion (hereinafter may be referred to also as a cylindrical portion) 12 is formed at the forward end of the metallic shell 11, and protectors 51 and 61 described later are externally fitted and fixed to the cylindrical annular portion. A thread 13 for fixation to an exhaust pipe of an engine is formed on the outer circumferential surface of a portion rearward (upward in the figure) of the cylindrical portion 12 and having a larger diameter than the cylindrical portion 12. A polygonal portion 14 used to screw the thread 13 of the sensor 1 into the exhaust pipe is provided rearward of the thread 13. A cylindrical portion 15 is provided rearward of the polygonal portion 14, and the protective tube (outer tube) 81 that covers a rear portion of the gas sensor 1 is fitted externally to and welded to the cylindrical portion 15. A thin-walled cylindrical portion 16 having a smaller outer diameter than the cylindrical portion 15 and used for crimping is provided rearward of the cylindrical portion 15. In FIG. 1, the cylindrical portion 16 for crimping has been crimped and bent inward. A gasket 19 for sealing by screwing is attached to the lower surface of the polygonal portion 14.

As shown in FIG. 2, the metallic shell 11 has a bore 18 extending therethrough in the direction of the axial line O. The bore 18 includes a small-diameter bore 18a disposed on the forward end side; and a large-diameter bore 18b disposed rearward of the small-diameter bore 18a and having a larger diameter than the small-diameter bore 18a. The metallic shell 11 further has a rearward-facing surface 17b that connects a wall surface 17a of the small-diameter bore 18a to a wall surface 17c of the large-diameter bore 18b. In the present embodiment, the rearward-facing surface 17b is tapered toward the forward end side. The wall surface 17a, the rearward-facing surface 17b, and the wall surface 17c are collectively referred to as an inner circumferential surface 17 of the metallic shell 11.

The ceramic holder 30 made of an insulating ceramic (e.g., alumina) and generally having the shape of a short cylinder is disposed inside the large-diameter bore 18b of the metallic shell 11. As shown in FIG. 2, the forward-facing surface 30a of the ceramic holder 30 includes: an outer forward-facing surface 30a2 tapered toward the forward end side; and a flat inner forward-facing surface 30a1 disposed inward of the outer forward-facing surface 30a2. An outer portion of the outer forward-facing surface 30a2 is engaged with the rearward-facing surface 17b, and the ceramic holder 30 is thereby placed in position within the metallic shell 11 so as to be loose-fitted therein.

The insertion hole 32 is formed at the center of the ceramic holder 30 and has a rectangular opening having substantially the same size as a transverse cross section of the sensor element 21 so that a portion of the sensor element 21 that is rearward of the protective layer 25 passes through the opening with almost no gap therebetween.

The ceramic holder 30 has a circular recess 35 having a larger diameter than the insertion hole 32 and located at the forward end of the insertion hole 32. The circular recess 35 extends from the inner forward-facing surface 30a1 of the ceramic holder 30 toward the rear end side and is in communication with the forward end of the insertion hole 32. In the present embodiment, the circular recess 35, which is larger in diameter than the insertion hole 32, has a flat bottom surface 35b (located at the forward end of the insertion hole 32). In the present embodiment, an inner circumferential surface 35i of the circular recess 35 is parallel to the axial line O. A forward edge 35e is formed at a position at which the inner circumferential surface 35i of the circular recess 35 is connected to the inner forward-facing surface 30a1. A portion of the inner forward-facing surface 30a1 on the forward edge 35e side is chamfered.

The sensor element 21 is inserted into the insertion hole 32 of the ceramic holder 30, and the forward end of the sensor element 21 protrudes forward beyond the forward-facing surface 30a of the ceramic holder 30 and the forward end 12a of the metallic shell 11. A rear end portion 26 of the protective layer 25 is accommodated within the circular recess 35. When the sensor 1 is assembled by inserting the sensor element 21 into the insertion hole 32 of the ceramic holder 30, the protective layer 25 may be damaged if the protective layer 25 collides with the wall surface of the insertion hole 32. To prevent this, it is preferable that the rear end portion 26 of the protective layer 25 is spaced apart forward from the forward end of the insertion hole 32 (the bottom surface 35b). The protective layer 25 is formed such that the axial length of the rear end portion 26 located within the circular recess 35 is shorter than the axial length of a forward end portion located outside the circular recess 35. This can prevent a reduction in detection accuracy of the sensor element 21.

The inner circumferential surface 35i of the circular recess 35 is spaced apart from the outer circumferential surface of the protective layer 25 accommodated within the circular recess 35. The entire inner circumferential surface 35i of the circular recess 35 is located radially inward of the wall surface 17a of the small-diameter bore 18a of the metallic shell 11 and an inner circumferential surface 51a of the inner protector 51, which is the innermost one (directly facing the element) of the protectors 51 and 61.

In the present embodiment, the forward end portion of the sensor element 21 is covered with the closed-end cylindrical protectors (protective covers) 51 and 61 having gas passage holes 56 and 67, respectively, and forming a double-layer structure. The rear end of the inner protector 51 is externally fitted and welded to the cylindrical portion 12 of the metallic shell 11. Two gas passage holes 56, for example, are provided in a rear end portion of a circumferential wall of the protector 51 so as to be symmetric in the circumferential direction. Meanwhile, four discharge holes 53, for example, are provided in a forward end portion of the protector 51 and arranged in the circumferential direction. The outer protector 61 is externally fitted to the inner protector 51 and welded to the cylindrical portion 12 together with the inner protector 51. Eight gas passage holes 67, for example, are provided in a forward end portion of a circumferential wall of the outer protector 61 and arranged in the circumferential direction, and a discharge hole 69 is provided at the center of the bottom of the protector 61 located on the forward end side thereof.

As shown in FIG. 1, the metallic terminals 75 disposed at the forward ends of the lead wires 71 extending to the outside through the seal member 85 resiliently come into pressure-contact with the respective electrode terminals 24 formed in the rear end 29 side portion of the sensor element 21. Thus, electrical contact between the metallic terminals 75 and the electrode terminals 24 is established. In the gas sensor 1 of the present embodiment, the metallic terminals 75, including their pressure contact portions, are disposed in respective accommodation spaces of a metallic terminal holder 91 in a facing arrangement. The metallic terminal holder 91 is formed of an insulating material and disposed inside the protective tube (metallic tube) 81 having tubular portions with different diameters. The metallic terminal holder 91 is prevented from moving radially and forward by an annular support member 80 fixedly provided inside the protective tube (metallic tube) 81. A forward end portion (large-diameter portion) 82 of the protective tube 81 is externally fitted and welded to the cylindrical portion 15 at the rear end of the metallic shell 11. Thus, a rear end portion of the gas sensor 1 is a gas-tightly covered. The lead wires 71 extend to the outside through the seal member (e.g., rubber) 85 disposed inside a small-diameter tubular portion 83 at the rear end of the protective tube 81. The small-diameter tubular portion 83 is crimped and reduced in diameter to compress the seal member 85, thereby maintaining the gas-tightness of this portion.

The seal member 85 is disposed so as to press forward the rear end of the metallic terminal holder 91, thereby enhancing the installation stability of the metallic terminal holder 91 and the metallic terminals 75 disposed therein. The metallic terminal holder 91 has a flange 93 formed on its outer circumference, and the flange 93 is supported on the annular support member 80 fixedly provided inside the protective tube 81. Thus, the compressive force of the seal member 85 is borne by the annular support member 80.

The first embodiment will be described with reference to FIG. 3. FIG. 3 shows a circular cross section (an A-A cross section of FIG. 2) obtained by cutting the gas sensor 1 along a plane orthogonal to the axial direction and passing through the gas passage holes 56. The inner protector 51 has gas passage holes 56a and 56b which are spaced from each other in the circumferential direction. In other words, the gas passage holes 56a and 56b are formed symmetrically in the circumferential direction with respect to the center of the inner protector 51. In FIG. 3, the protective layer 25 is not illustrated.

The circular cross section of the gas sensor 1 is divided into first and second divisional regions by a straight line AL which passes through the center axis of the inner protector 51 and does not pass through any gas passage holes. The gas passage hole 56a is provided in the first divisional region. The gas passage hole 56b is provided in the second divisional region. Since the gas passage hole 56b is perfect circular and has a diameter of 1.0 mm, its opening area is about 0.785 mm$^2$. Since the gas passage hole 56a is perfect circular and has a diameter of 1.5 mm, its opening area is about 1.766 mm$^2$. Specifically, the opening area of the gas passage hole 56b located in the second divisional region is smaller than the opening area of the gas passage hole 56a located in the first divisional region. In other words, the opening area of the gas passage hole 56a located in the first divisional region differs from the opening area of the gas passage hole 56b located in the second divisional region. Namely, the total opening area of the gas passage hole located in the first divisional region is smaller than the total opening area of the gas passage hole located in the second divisional region.

Figure 4:
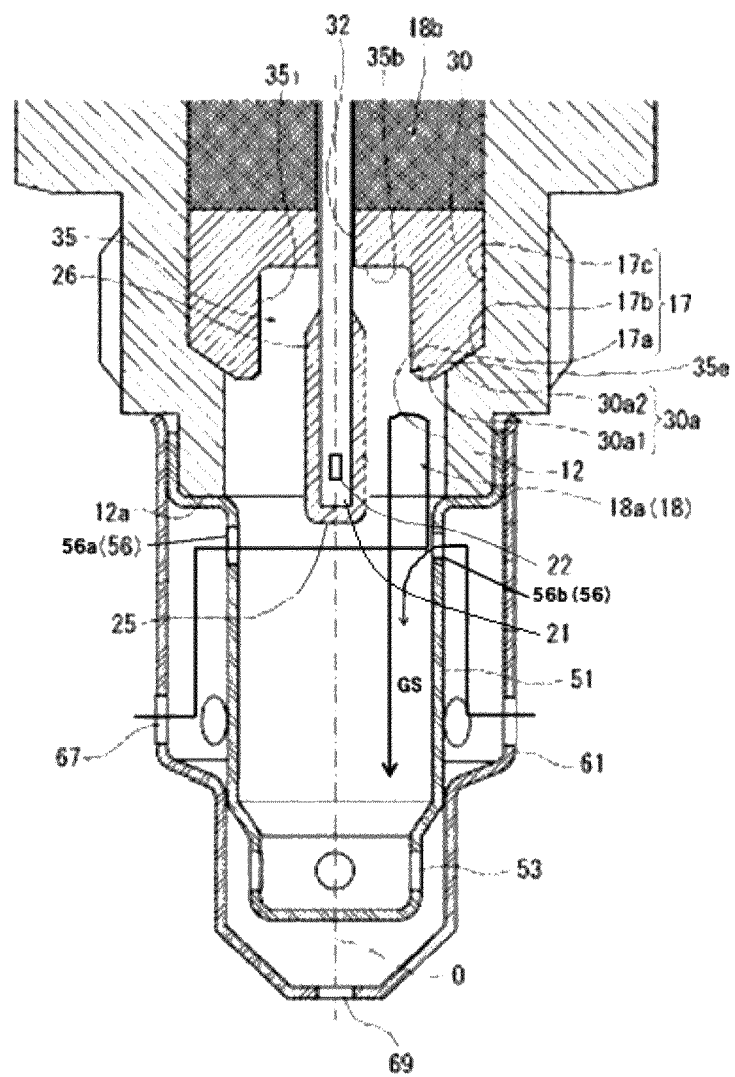
FIG. 4 is an illustration showing a gas flow in the first embodiment.
Figure 5:
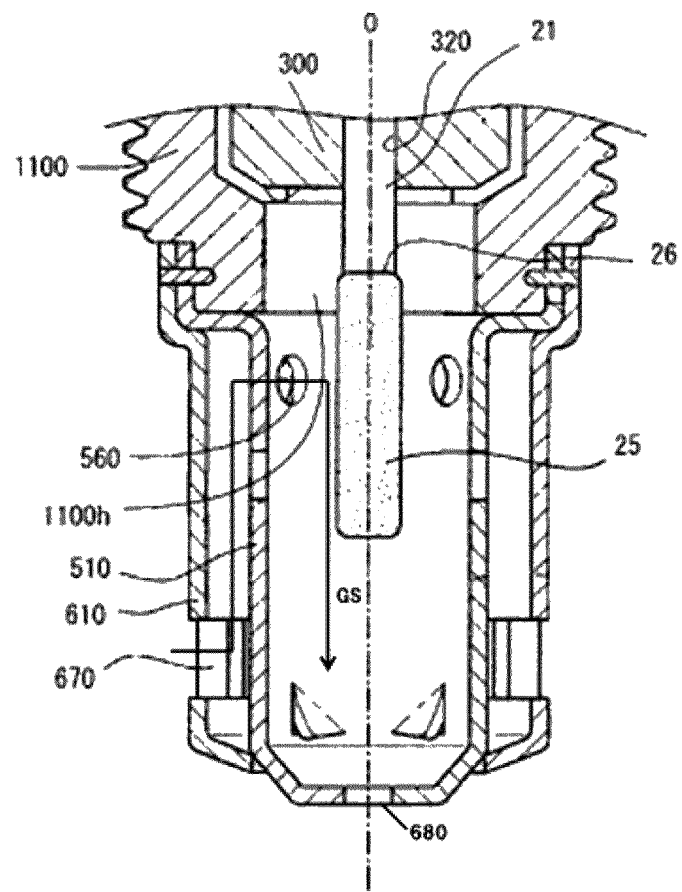
FIG. 5 is a partial cross-sectional view of a conventional gas sensor.

FIG. 4 is an illustration showing the flow of gas in the first embodiment. The gas flow GS is indicated by an arrow. As shown in FIG. 4, the gas under measurement introduced through the gas passage holes 56a and 67 of the protectors 51 and 61 collides with the gas under measurement introduced through the gas passage hole 56b located on the side opposite the gas passage hole 56a. However, the gas under measurement introduced through the gas passage holes 56a having a larger opening area flows toward the bore 18, while using, as a stepping-stone, the gas under measurement introduced through the gas passage holes 56b. The gas under measurement then flows toward the discharge holes 53, whereby the gas flow GS is formed. The sensing section 22 is present in the path of the gas flow GS. Therefore, a sufficient amount of the gas under measurement can reach the sensing section 22 of the sensor element 21.

The gas sensor of the present invention can be embodied with its structure and configuration appropriately modified, so long as the modifications do not go beyond the scope of the present invention.

Specifically, in the above embodiments, the sensor element has a strip shape with a rectangular transverse cross section. However, the sensor element used in the gas sensor of the present invention may have a square transverse cross section or another cross-sectional shape. In the above embodiments, the gas sensor of the present invention is embodied as a full-range air-fuel-ratio gas sensor. However, the gas sensor of the present invention may be embodied as another gas sensor. The shape of the gas passage holes is not limited to a perfect circle, and the gas passage holes may have, for example, a rectangular shape. The gas passage holes may have different opening areas.

DESCRIPTION OF REFERENCE NUMERALS 1 gas sensor
11 metallic shell (housing)
18 bore
21 sensor element
22 sensing section
25 protective layer
30 ceramic holder
32 insertion hole of ceramic holder
35 circular recess
51 inner protector
56, 67 gas passage hole
61 outer protector
O axial line

The invention claimed is:

1. A gas sensor comprising:
a sensor element extending in an axial direction and including a sensing section which is disposed at a forward end of the sensor element and detects a specific gas component in a subject gas;
a tubular metallic shell which circumferentially surrounds and holds the sensor element; and
a protector which has a circumferential wall and a forward end wall disposed forward of the circumferential wall, the protector having a rear end portion fixed to a forward end of the metallic shell, the protector having gas introduction holes which are formed in the circumferential wall and through which the subject gas is introduced into the protector,
wherein the sensing section is disposed rearward of a rearmost one of the gas introduction holes, and wherein,
in a circular cross-section of the protector formed along a plane which is orthogonal to the axial direction and passes through the gas introduction holes, one gas introduction hole and another gas introduction hole having an opening area different from that of the one gas introduction hole are arranged along an imaginary line passing through the center of the cross-section such that the two gas introduction holes are located on opposite sides with respect to the center of the circular cross-section, and
the gas introduction holes are configured to allow the subject gas to flow in a radial direction of the circular cross-section from the one gas introduction hole toward the other.

2. The gas sensor according to claim 1, wherein, when the circular cross-section is bisected into first and second divisional regions by a line which passes through the center of the circular cross-section and does not pass through the gas introduction holes, a total opening area of the gas introduction hole located in the first divisional region is smaller than a total opening area of the gas introduction hole located in the second divisional region.

3. The gas sensor according to claim 1, wherein a forward end of the sensor element is located rearward of the rearmost one of the gas introduction holes.

4. The gas sensor according to claim 1, further comprising:

a bore formed between the sensor element and the tubular metallic shell, wherein the one gas introduction hole is formed larger than the other gas introduction hole such that the subjected gas introduced through the one gas introduction hole flows toward the bore.

\* \* \* \* \*